United States Patent [19]

Emilsson et al.

[11] Patent Number: 4,473,136
[45] Date of Patent: Sep. 25, 1984

[54] RAIL VEHICLE DISC BRAKE ARRANGEMENT

[75] Inventors: Fred S. Emilsson, Trelleborg; Bo G. Stensson, Brösarp; Lars M. Severinsson, Hishult, all of Sweden

[73] Assignee: SAB Industri AB, Landskrona, Sweden

[21] Appl. No.: 375,021

[22] PCT Filed: Aug. 14, 1981

[86] PCT No.: PCT/SE81/00229
§ 371 Date: Apr. 20, 1982
§ 102(e) Date: Apr. 20, 1982

[87] PCT Pub. No.: WO82/00619
PCT Pub. Date: Mar. 4, 1982

[30] Foreign Application Priority Data
Aug. 27, 1980 [SE] Sweden ................... 8006005

[51] Int. Cl.³ .......................................... B61H 13/20
[52] U.S. Cl. ................................... 188/59; 188/71.8; 188/72.4
[58] Field of Search ............... 188/59, 198, 58, 72.1, 188/72.4, 202, 196 D, 24.12, 24.19, 24.21, 71.8, 71.9, 79.5 R

[56] References Cited

U.S. PATENT DOCUMENTS

| | | | |
|---|---|---|---|
| 2,713,400 | 7/1955 | Coskun | 188/59 |
| 3,645,364 | 2/1972 | Otto et al. | 188/59 X |
| 3,692,152 | 9/1972 | Larsson | 188/79.5 K |
| 3,908,803 | 9/1975 | Otto et al. | 188/71.8 |
| 3,997,035 | 12/1976 | Zeilder | 188/79.5 K |

FOREIGN PATENT DOCUMENTS

| | | | |
|---|---|---|---|
| 138964 | 10/1979 | Japan | 188/71.8 |
| 371149 | 11/1974 | Sweden | |
| 1236877 | 6/1971 | United Kingdom | |
| 2018918 | 10/1979 | United Kingdom | |

Primary Examiner—Duane A. Reger
Assistant Examiner—M. P. Gilday
Attorney, Agent, or Firm—Laurence R. Brown

[57] ABSTRACT

A rail vehicle disc brake arrangement includes a yoke (1) with a brake cylinder (11) and a slack adjuster (16). In order to obtain advantages as regards design, function and space requirements the yoke (1) comprises two telescoping yoke parts: a fixed part (4) and a movable part (5). The slack adjuster (16) is arranged to act between these two parts. The brake cylinder (11) on the movable yoke part is connected to a yoke lever (6), which is pivotally attached to the movable part, has a pad holder (8) with a brake pad (9), and controls the slack adjuster (16).

5 Claims, 6 Drawing Figures

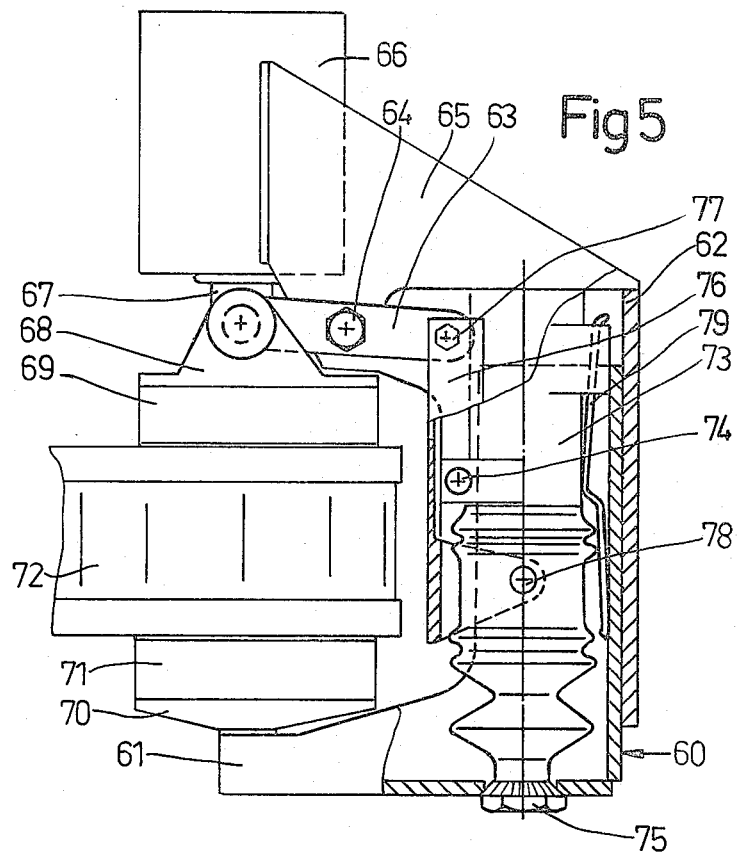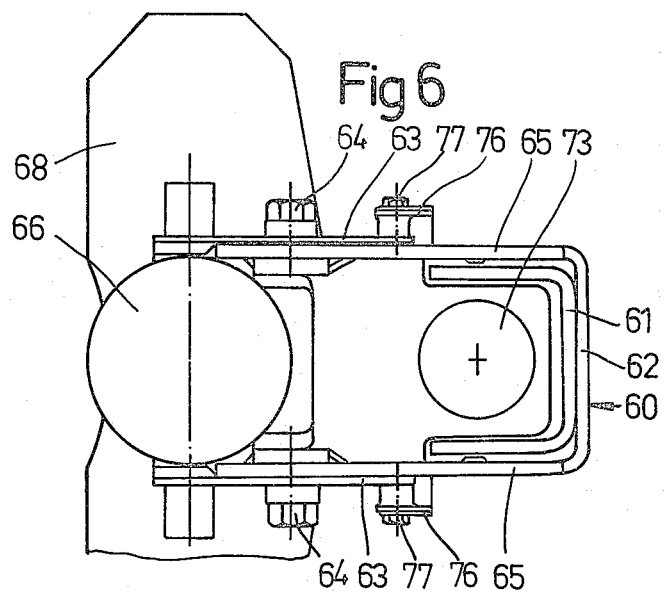

4,473,136

RAIL VEHICLE DISC BRAKE ARRANGEMENT

TECHNICAL FIELD

This invention relates to a rail vehicle disc brake arrangement, including a disc brake yoke to be suspended from an underframe or bogie of the vehicle in the vicinity of the disc or discs to be braked, the yoke being provided with a fluid operated brake cylinder, a slack adjuster, and associated pad holders with brake pads on either side of the disc or discs.

BACKGROUND ART

Most disc brake arrangements for rail vehicles are of a type in the art usually referred to as the caliper type and having two legs connected to each other at an intermediate portion. The free end of each leg is provided with a pad holder and a brake pad, whereas the opposite ends thereof are actuated by a brake cylinder often incorporating a built-in slack adjuster. The slack adjuster may, however, in certain cases be arranged somewhere else in the disc brake arrangement, for example as shown in U.S. Pat. No. 3,645,364, where it constitutes the connection link between the two legs or levers of the caliper.

Although many intermediate variations may be found a second but still less usual main type of rail vehicle disc brake arrangement is the yoke type, where a substantially stiff yoke extends around the disc to be braked and a brake force is applied from said yoke, for example by means of a brake cylinder on the yoke at the disc. A relatively recent and typical example of such an arrangement is shown in GB No. 2 018 918 but also GB No. 1 236 877 is illustrative.

The known arrangements suffer from different disadvantages, some of them having regard to specific applications, and it is of utmost importance to improve the versatility of the arrangement so as to allow the use of a certain arrangement with only relatively minor modifications for a great variety of applications. In other words: it is desirable to obtain an arrangement consisting of relatively few interchangeable components usable for a great variety of applications on different kinds of vehicles and bogies with a low space requirement, low price, low maintenance cost and so on.

THE INVENTION

All the different requirements are according to the invention fulfilled and the disadvantages with prior arrangements obviated if the slack adjuster is arranged to act between two telescoping yoke parts—a fixed part and a movable part—of which the yoke is comprised, if one pad holder with its brake pad, in a way known per se, is arranged on the fixed yoke part, and if a yoke lever with the second pad holder and its brake pad is pivotally attached at an intermediate portion thereof to the movable yoke part, is connected to the brake cylinder mounted on the movable yoke part, and is arranged to control the slack adjuster.

If the available space axially from the disc is limited, which it often is, and if a force amplification from the brake cylinder is desirable, the brake cylinder may be connected to the yoke lever at its end opposite to the pad holder and brake pad, the yoke lever thus acting as a force transmitting means.

In such a case the slack adjuster preferably is of the axial type, is arranged within the yoke, is attached to the movable yoke part and is anchored to the fixed yoke part, the yoke lever coacting with a control member protruding from the slack adjuster.

In a modified embodiment, which is of special interest if it is desired to use a well tested and comparatively cheap slack adjuster made in very large series, the slack adjuster is of the automatic brake lever type, primarily intended for automotive S-cam drum brakes, is attached on the movable yoke part, and with its outgoing work wheel is connected to a cam-shaft, which is rotatably arranged in the movable yoke part and has a cam engaging a corresponding hole in the fixed yoke part.

In such a case a control arm of the automatic brake lever may be connected to a transmission arm pivotally attached to the yoke lever.

If there is more space axially than radially around the disc and if other special requirements are to be fulfilled, the brake cylinder may be connected to the yoke lever at its connection to the pad holder with its brake pad, the opposite arm of the lever acting as a control means for the slack adjuster.

BRIEF DESCRIPTION OF THE DRAWINGS

The invention will be described in further detail below reference being made to the accompanying drawings, in which FIGS. 5 and 6 are a partly sectional plan view and a side view respectively of a third embodiment of the invention.

DETAILED DESCRIPTION OF THREE EMBODIMENTS

Figure 1:
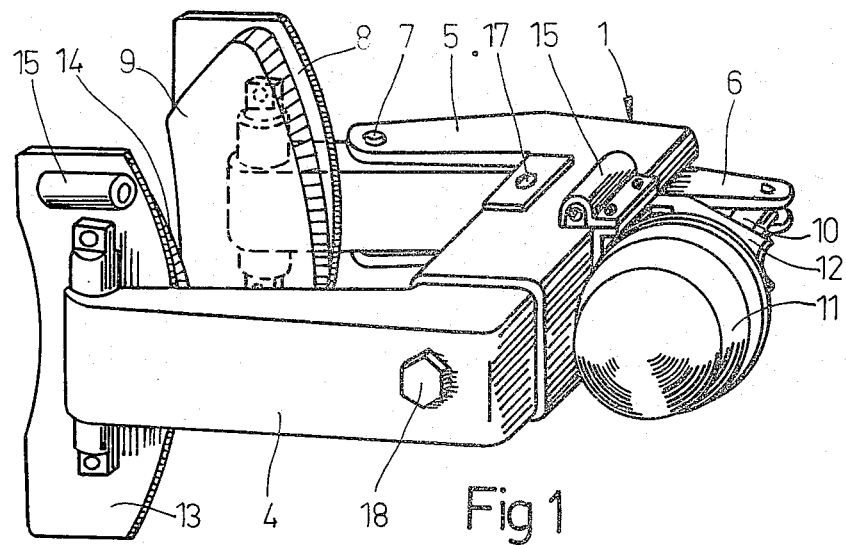
FIG. 1 is a perspective view of a rail vehicle disc brake arrangement according to the invention.
Figure 2:
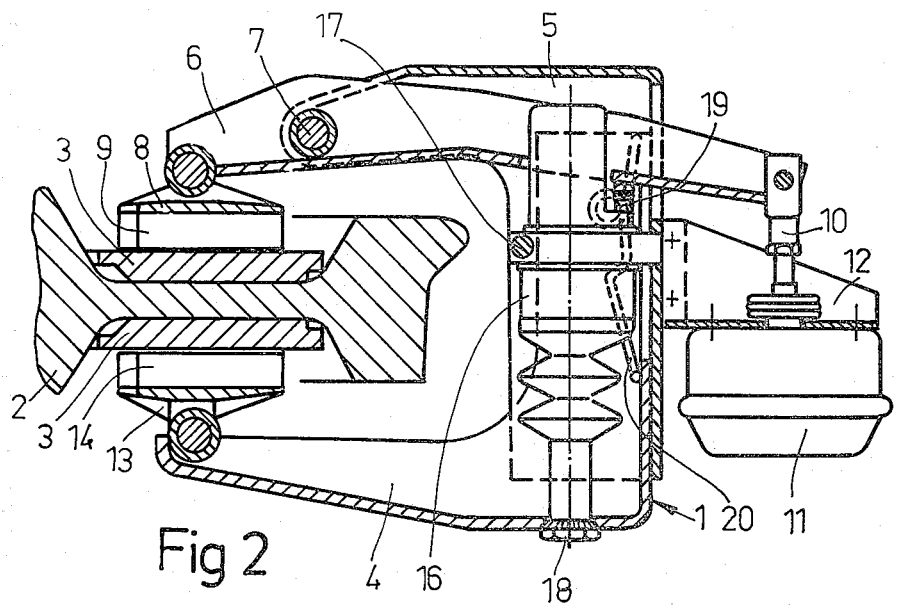
FIG. 2 is a partly sectional plan view of a disc brake arrangement very similar to the one shown in FIG. 1, FIGS. 3 and 4 are a plan view and a side view respectively of a second embodiment of the invention.

A perspective view of a first embodiment of a rail vehicle disc brake arrangement is shown in FIG. 1, whereas a mainly sectional plan view of a closely similar embodiment is shown in FIG. 2. These two figures will be regarded as showing the same embodiment, and the same reference numerals will thus be used.

At the outset it may be noted that the first embodiment shown in FIGS. 1 and 2 is illustrated as intended for cooperation with wheel-mounted brake discs, whereas the two remaining embodiments are illustrated together with axle-mounted discs; however, only minor modifications are necessary for using either disc type for any embodiment.

Also, suspensions for the different disc brake arrangements are only suggested; any suitable type of suspension may be used and the chosen suspension does not form any part of the invention.

Referring now to FIGS. 1 and 2 a two-part disc brake yoke 1 is to be suspended from a rail vehicle underframe or bogie in any suitable way in the vicinity of a wheel 2 with wheel discs 3 attached thereto.

The yoke 1 comprises two telescoping parts 4 and 5, of which the one nearest to the viewer in FIG. 1 or the lower one in FIG. 2 may be called the fixed yoke part 4 and thus the second one the movable yoke part 5.

A yoke lever 6 is at an intermediate portion pivotally attached to the movable yoke part 5 at 7. A pad holder 8 with a brake pad 9 is pivotally attached to one end of the yoke lever 6, whose opposite end is pivotally attached to a piston rod 10 of a (pneumatic) brake cylinder 11, which is mounted on a bracket 12 bolted to the movable yoke part 5.

A pad holder 13 corresponding to the pad holder 8 is attached to the fixed yoke part 4 and is likewise provided with a brake pad 14.

As shown in FIG. 1 the movable yoke part 5 and the two pad holders 8 and 13 are provided with suspension attachments 15 (of which the one on the pad holder 8 is not visible) for the suspension of the arrangement from a vehicle underframe or bogie by means of not shown suspension links or the like.

A slack adjuster 16 is provided between or inside the two yoke parts 4 and 5. The purpose of this slack adjuster 16, whose design and function is not material to the present invention and will not be further described, is to adjust the position of the movable yoke part 5 relative to the fixed yoke part 4 or in other words the width of the yoke 1 depending on the wear of the brake pads 9 and 14 so as to keep the relative angular position of the yoke lever 6 or the stroke of the piston rod 10 constant irrespective of the pad wear.

The slack adjuster 16 is at 17 attached to the movable yoke part 5, and its end is anchored to the fixed part 4 by means of a screw head 18. There is a serrated cone clutch between the fixed yoke part 4 and the screw head 18 for normally preventing relative rotation but for allowing manual adjustment from the outside provided that the resistance of the clutch is overcome.

A control member 19 on the slack adjuster 16 cooperates with yoke lever 6 for giving the necessary control signal to the slack adjuster, if at a brake application the angular movement of the yoke lever should be excessive indicating excessive wear of the brake pads 9 and 14.

A spring 20 is provided between the fixed member 4 and the slack adjuster 16 (or thus the movable member 5) so as to prevent rattle and undesired noise between the parts.

Figure 3:
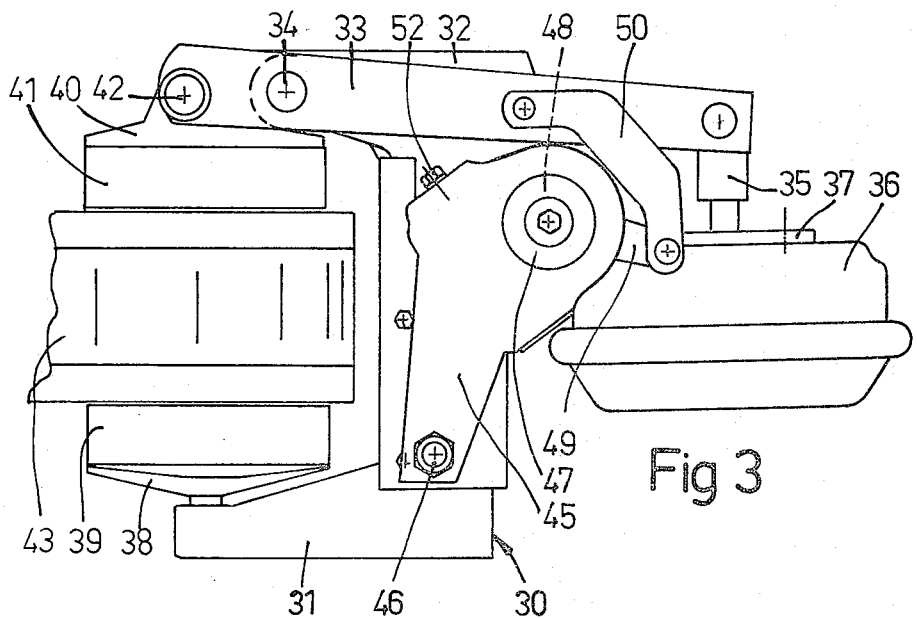
Figure 4:
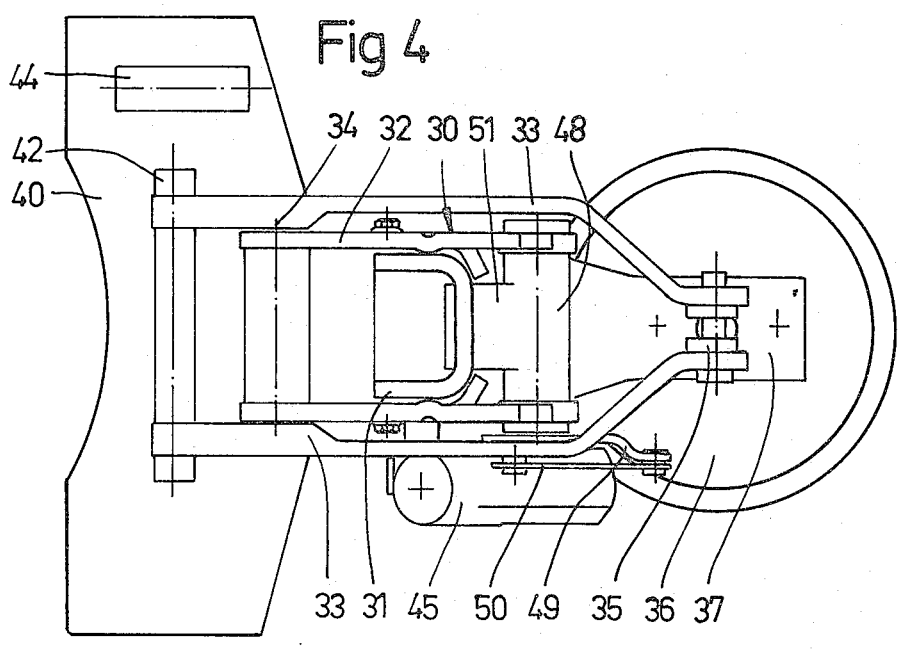

A second embodiment of a disc brake arrangement according to the invention is shown in FIGS. 3 and 4. The only essential difference compared to the FIGS. 1 and 2 embodiment is the type of slack adjuster employed.

Also in this embodiment a disc brake yoke 30 consists of two telescoping parts - a fixed part 31 and a movable part 32. A yoke lever 33 (in this case consisting of a pair of arms as shown in FIG. 4) is pivotally attached to the movable yoke part 32 at 34. The end of this lever 33 is pivotally connected to the piston rod 35 of a brake cylinder 36 mounted on a bracket 37, which is attached to the movable yoke part 32.

A pad holder 38 with a brake pad 39 is attached to the fixed yoke part 31, whereas a pad holder 40 with a brake pad 41 is attached to the yoke lever 33 at 42.

The two brake pads 39 and 41 are arranged to coact with an axle-mounted brake disc 43, but as earlier stated only minor modifications are necessary for adopting the shown brake arrangement for use with wheel-mounted brake discs.

The brake arrangement is to be suspended from a vehicle underframe or bogie in a way corresponding to the first embodiment; only a suspension attachment 44 on the pad holder 40 is shown.

The slack adjusting function is in this case performed by a slack adjuster especially well known in the automotive brake art as an automatic brake lever, which is normally used as a brake force transmitting and slack adjusting lever in an S-cam drum brake system for heavy road vehicles, such as trucks and buses. Such a slack adjuster is described in U.S. Pat. No. 3,692,152 issued Sep. 19, 1972 to K. B. Larsson.

For the proper understanding of the invention and the function of the disc brake arrangement it is not necessary to have any knowledge about the design and function of the automatic brake lever used; no description thereof is thus offered here.

An automatic brake lever 45 of the specified type is thus fixedly mounted on the movable yoke part 32 by means of a bolt 46 and is—by means of its outgoing worm wheel 47—attached to a camshaft 48 rotatably mounted in the movable yoke part 32.

An outgoing control arm 49 of the brake lever 45 is coupled to a transmission arm 50, which is pivotally attached to the yoke lever 33.

A cam 51 of the cam-shaft 48 extends into a correspondingly shaped hole in the fixed yoke part 31, so that a relative sliding or telescoping motion between the two yoke parts 31 and 32 is obtained at a rotational movement of the worm wheel 47 in the brake lever 45 or thus of the camshaft 48. Such rotational movement will be obtained during a brake operation under the action of the brake cylinder 36, if a control movement transmitted to the slack adjusting mechanism in the automatic brake lever 45 via the transmission arm 50 and the control arm 49 indicates that excessive wear of the brake pads 39 and 41 has occured. The result of said rotational movement is that the total width of the yoke 30 is diminished.

Manual adjustment of the brake lever 45 and thus of the width of the yoke 30 is possible by means of a manual adjustment screw 52 on the brake lever 45.

A possible modification of the embodiment shown in FIGS. 3 and 4 is to replace the cam-shaft and and cam arrangement 48, 51 with a rack and pinion arrangement between the two yoke parts 31 and 32.

A third embodiment, only slightly differing from the first embodiment shown in FIGS. 1 and 2, is shown in FIGS. 5 and 6.

Also in this case a disc brake yoke 60 consists of two telescoping parts—a fixed part 61 and a movable part 62. A yoke lever 63 (or rather a pair of yoke levers) is pivotally attached to the movable yoke part 62 at 64. The movable yoke part 62 is provided with an integral bracket 65 for a brake cylinder 66, preferably a hydraulic brake cylinder, whose piston rod 67 is connected to the yoke lever 63 and a pad holder 68 with a brake pad 69.

A corresponding pad holder 70 with a brake pad 71 is attached to the fixed yoke part 61. Both brake pads 69, 71 are arranged to cooperate with a brake disc 72, and the whole disc brake arrangement is suspended from the vehicle underframe or bogie in any conventional, not shown way.

A slack adjuster 73 of the same type as the one used in the embodiment shown in FIGS. 1 and 2 is provided between the two yoke parts 61 and 62. The adjuster 73 is thus attached to the movable yoke part 62 at 74 and has its end anchored to the fixed part by means of a screw head 75 allowing manual adjustment of the adjuster.

A control rod 76 is connected on the one hand to the yoke lever 63 at 77 and on the other hand to the adjuster 73 at 78. In the same manner as in the two other embodiments the purpose of the slack adjuster is to diminish the width of the yoke 60 at the occurence of excessive wear of the brake pads 69, 71. Such excessive wear is indicated by an excessive angular movement of the yoke lever 63 and thus an excessive linear movement of the control rod 76 during a brake operation.

An anti-rattle spring 79 is provided between the adjuster 73 and the fixed part 61.

Numerous modifications are possible within the scope of the appended claims, for example regarding the type of slack adjuster and brake cylinder used, as well as regarding their positions. Especially it is to be noted that, although in the FIGS. 1-4 embodiments the yoke lever is shown as a substantially straight arm and the brake cylinder is mounted on the end of the yoke opposite the disc, a curved yoke lever and a brake cylinder mounted on the side of the yoke may be a good solution under certain circumstances.

We claim:

1. A rail vehicle arrangement for braking at least one disc, comprising in combination a disc brake yoke with two telescoping yoke parts to be suspended from an underframe of the vehicle in the vicinity of the disc to be braked, two pad holders with corresponding brake pads positioned on either side of the disc, a slack adjuster arranged to act between said two telescoping yoke parts having a control arm, one of said yoke parts defining a pivot axis intermediate the slack adjuster and the discs, one pad holder with a corresponding brake pad being mounted on an end of the other said yoke part remote from the slack adjuster, a yoke lever having an intermediate pivot point pivoted on said pivot axis with the second pad holder and its brake pad disposed at one end, means attaching the other end of the yoke lever having the pivot point to a brake operating cylinder mounted on said yoke part defining a pivot axis for operation of the brake pads, and means operating the slack adjuster control arm with movements of the yoke lever to control the slack adjuster.

2. A disc brake arrangement according to claim 1 with a control member protruding from the slack adjuster, characterized in that the slack adjuster is of the axial type, is arranged within the yoke, is attached to the second yoke part and is anchored to the first yoke part so that the yoke lever coacts with said control member protruding from the slack adjuster.

3. A rail vehicle arrangement for braking at least one disc, comprising in combination a disc brake yoke with two telescoping yoke parts to be suspended from an underframe of the vehicle in the vicinity of the disc to be braked, a fluid operated brake cylinder mounted on said yoke, two pad holders with corresponding brake pads positioned on either side of the disc, a slack adjuster arranged to act between said two telescoping yoke parts, namely, a first part and a second part on the yoke, one pad holder with a corresponding brake pad being mounted on the first yoke part, a yoke lever carrying the second pad holder and its brake pad, means pivotally attaching the yoke lever at an intermediate portion thereof to the second yoke part, means attaching the yoke lever to the cylinder for operation of the brake pads, and means operating a slack adjuster control arm with the yoke lever to control the slack adjuster wherein the slack adjuster is attached on the second yoke part and is of the automatic brake lever type primarily intended for automotive S-cam drum brakes, with a worm wheel connected to a cam-shaft rotatably arranged in the second yoke part, and a cam on the cam-shaft engaging a corresponding hole in the first yoke part.

4. A disc brake arrangement according to claim 3, characterized in that a control arm on the slack adjuster is connected to a transmission lever arm pivotally attached to the yoke lever.

5. A rail vehicle arrangement for braking at least one disc, comprising in combination a disc brake yoke with two telescoping yoke parts to be suspended from an underframe of the vehicle in the vicinity of the disc to be braked, a fluid operated brake cylinder mounted on said yoke, two pad holders with corresponding brake pads positioned on either side of the disc, a slack adjuster arranged to act between said two telescoping yoke parts, namely, a first part and a second part on the yoke, one pad holder with a corresponding brake pad being mounted on the first yoke part, a yoke lever carrying the second pad holder and its brake pad, means pivotally attaching the yoke lever at an intermediate portion thereof to the second yoke part, means attaching the yoke lever to the cylinder for operation of the brake pads, and means operating a slack adjuster control arm with the yoke lever to control the slack adjuster wherein the brake cylinder is connected to the yoke lever at its connection to the pad holder with its brake pad, and having an arm on the lever acting as a control means for the slack adjuster.

* * * * *